(12) United States Patent
Trenary (10) Patent No.: US 11,135,705 B2
(45) Date of Patent: Oct. 5, 2021

(54) ADAPTER FOR TURNING A KNOB AND METHODS FOR MAKING AND USING THE ADAPTER

(71) Applicant: Gulfstream Aerospace Corporation, Savannah, GA (US)

(72) Inventor: Jerry L. Trenary, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 385 days.

(21) Appl. No.: 16/355,327

(22) Filed: Mar. 15, 2019

(65) Prior Publication Data

US 2020/0290183 A1    Sep. 17, 2020

(51) Int. Cl.
*B25B 21/00* (2006.01)
*B25B 23/00* (2006.01)
*F16D 1/10* (2006.01)

(52) U.S. Cl.
CPC ........ *B25B 21/002* (2013.01); *B25B 23/0035* (2013.01); *F16D 1/101* (2013.01); *F16D 2001/102* (2013.01)

(58) Field of Classification Search
CPC ..... B25B 13/48; B25B 13/5091; B25B 13/44; B25B 13/00; B25B 13/50; B25B 21/002; B25B 23/0035; F16D 1/101; F16D 2001/102
See application file for complete search history.

(56) References Cited

U.S. PATENT DOCUMENTS

| | | | |
|---|---|---|---|
| 3,545,585 A * | 12/1970 | Eaton, Jr. | ................ F16D 1/101 192/69.71 |
| 3,635,106 A | 1/1972 | Homs | |
| 6,161,456 A | 12/2000 | Langford | |
| 6,378,401 B1 | 4/2002 | Koepsell et al. | |
| 6,457,208 B1 * | 10/2002 | Keith | .................... E05B 1/0053 16/422 |
| 9,409,288 B1 | 8/2016 | Huene | |
| 2009/0320651 A1 * | 12/2009 | Kramer | .................. B25B 13/48 81/176.2 |
| 2017/0348834 A1 * | 12/2017 | Miller | .................. B25B 21/002 |
| 2018/0029204 A1 * | 2/2018 | Koyuncu | ................ B25B 13/50 |

* cited by examiner

*Primary Examiner* — David B. Thomas
(74) *Attorney, Agent, or Firm* — LKGlobal | Lorenz & Kopf, LLP (57) ABSTRACT

Adapters for use with a driving device for turning a knob, and methods for making and using such an adapter are provided. In one example, an adapter includes a shaft that extends distally from a proximal end portion to a distal end portion and that defines a longitudinal axis. The proximal end portion is configured to operatively couple to the driving device for rotating the shaft about the longitudinal axis. An adapter body is coupled to the distal end portion of the shaft. At least one engaging member is disposed radially outward from the longitudinal axis and is configured for removably engaging the knob. A collar surrounds at least a portion of the at least one engaging member.

20 Claims, 7 Drawing Sheets

ADAPTER FOR TURNING A KNOB AND METHODS FOR MAKING AND USING THE ADAPTER

TECHNICAL FIELD

The technical field relates generally to knobs that can be tightened and/or loosened, and more particularly, relates to adapters for use with a driving device for turning a knob for tightening and/or loosening the knob and methods for making and using such an adapter.

BACKGROUND

In many manufacturing industries including, for example, the aircraft industry, hand knobs that can be tightened or loosened by turning are used to hold various components or other workpieces together during production and/or service maintenance. For example, fixtures are used for locating various components to an aircraft frame. A significant number of hand knobs may be used to hold the fixture, the various components, and the airframe together for drilling and/or assembly.

Unfortunately, repetitive and/or frequent turning of knobs by hand to tighten and/or loosen the knobs requires extending the range of motion of the wrist and forearm of a mechanic or other worker while applying force that can result in fatigue, discomfort, and/or injury. Further, it can be inefficient and time-consuming for turning each hand knob manually, and additionally can result in different amounts of pressure being applied by each hand knob depending on the person turning the knob.

Accordingly, it is desirable to provide an improved aid and a method for turning knobs that overcome some or all of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of an adapter for use with a driving device for turning a knob, a method for making such an adapter, and a method for turning a knob using such an adapter are provided herein.

In a first non-limiting embodiment, the adapter includes a shaft extending distally from a proximal end portion to a distal end portion and defining a longitudinal axis. The proximal end portion is configured to operatively couple to the driving device for rotating the shaft about the longitudinal axis. The adapter further includes, but is not limited to, an adapter body that is coupled to the distal end portion of the shaft. The adapter body includes, but is not limited to, at least one engaging member that is disposed radially outward from the longitudinal axis and that is configured for removably engaging the knob. The at least one engaging member comprises a plurality of projecting members radially spaced apart from and extending substantially parallel to the longitudinal axis. The adapter body further includes, but is not limited to, a collar that surrounds at least a portion of the at least one engaging member.

In another non-limiting embodiment, a method for making an adapter includes, but is not limited to, obtaining a shaft that extends distally from a proximal end portion to a distal end portion and defines a longitudinal axis. The proximal end portion of the shaft is configured to operatively couple to the driving device for rotating the shaft about the longitudinal axis. The method further includes, but is not limited to, forming an adapter body. The adapter body includes, but is not limited to, at least one engaging member that is disposed radially outward from the longitudinal axis and that is configured for removably engaging the knob. The at least one engaging member includes a plurality of projecting members radially spaced apart from and extending substantially parallel to the longitudinal axis. The adapter body further includes, but is not limited to, a collar that surrounds at least a portion of the at least one engaging member. The method further includes, but is not limited to, coupling the distal end portion of the shaft to the adapter body.

In another non-limiting embodiment, a method for turning a knob includes, but is not limited to, coupling a proximal end portion of a shaft of an adapter to a driving device. The shaft extends distally from the proximal end portion to a distal end portion and defines a longitudinal axis. The distal end portion of the shaft is coupled to an adapter body of the adapter. The method further includes, but is not limited to, engaging the knob with at least one engaging member of the adapter body. The at least one engaging member is disposed radially outward from the longitudinal axis. The at least one engaging member includes a plurality of projecting members radially spaced apart from and extending substantially parallel to the longitudinal axis. Engaging the knob includes, but is not limited to, positioning the at least one engaging member on the knob such that a collar of the adapter body that at least partially surrounds the at least one engaging member at least partially covers the knob. The method further includes, but is not limited to, actuating the driving device to rotate the shaft about the longitudinal axis, thereby rotating the adapter body including the at least one engaging member to turn the knob.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to adapters for use with a driving device for turning a knob, methods for making such adapters, and methods for turning a knob using such adapters. The exemplary embodiments taught herein provide an adapter including a shaft that extends distally from a proximal end portion to a distal end portion and that defines a longitudinal axis. An adapter body is coupled to the distal end portion of the shaft. At least one engaging member is disposed radially outward from the longitudinal axis. A collar surrounds at least a portion of the at least one engaging member.

In an exemplary embodiment, the proximal end portion of the adapter shaft is coupled to a driving device, such as, for example, a torque adjustable drill or the like. The at least one engaging member of the adapter body is removably engaged with a knob, such as, for example a hand knob with prongs. During engagement of the at least one engaging member with the knob, the collar of the adapter body at least partially covers the knob. The driving device is actuated to rotate the shaft about the longitudinal axis, thereby rotating the adapter body including the at least one engaging member to turn the knob.

In an exemplary embodiment, advantageously by using the driving device to rotate the adapter to turn the knob, the knob can be tightened and/or loosened without requiring a mechanic or other worker to extend the range of motion of their wrist and/or forearm while applying force, thereby reducing, minimizing, or eliminating any fatigue, discomfort, and/or injury resulting from performing the task. Further, in an exemplary embodiment, advantageously by using the driving device to rotate the adapter, the knob can be efficiently turned to produce a more uniform clamping pressure, for example, when tightening multiple knobs.

FIGS. 1-2, 7, and 9 illustrate an adapter 10 for use with a driving device 12 for turning a knob(s) 14. The adapter includes a shaft 16 and an adapter body 18 that is coupled to the shaft 16.

Figure 5:
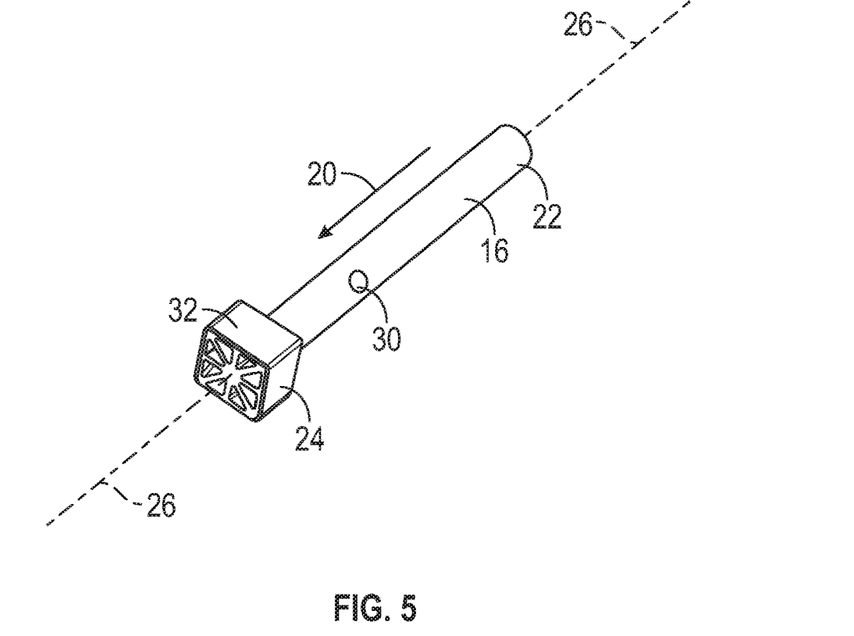
FIG. 5 illustrates a perspective side view of a shaft in accordance with an exemplary embodiment.

Referring also to FIG. 5, the shaft 16 extends in a distal direction (indicated by single headed arrow 20) from a proximal end portion 22 to a distal end portion 24 and defines a longitudinal axis 26. The proximal end portion 22 is sized or otherwise configured to be operatively coupled to a driving device 28, such as, for example, a torque adjustable drill or the like, for rotating the shaft 16 about the longitudinal axis 26. As illustrated, in an exemplary embodiment, the distal end portion 24 of the shaft 16 has a polygonal shaped outer profile 32, such as, for example, a rectangular box shaped outer profile, a square box outer shaped, or the like. As will be discussed in further detail below, the shaft 16 has a shaft opening 30 that extends transverse to the longitudinal axis 26 through the shaft 16.

The adapter body 18 is coupled to the distal end portion 24 of the shaft 16. Referring to FIGS. 1-5 and 8, in an exemplary embodiment, the adapter body 18 includes an adapter base 34 that is coupled to the distal end portion 24 of the shaft 16, a collar 36 that extends distally from the perimeter edge portion of the adapter base 34, and one or more engaging members 38 and/or 40 that are disposed radially outward from the longitudinal axis 26 and that are configured for removably engaging the knob 14. As illustrated and will be discussed in further detail below, the engaging members 38 and/or 40 extend distally from the adapter base 34. The collar 36 surrounds at least a portion of the engaging members 38 and/or 40 such that when the engaging members are positioned on and/or against the knob 14, the collar 36 at least partially covers the knob 14. As illustrated, distal portions of the engaging members 38 extend past the distal perimeter edge of the collar 36 to facilitate positioning the engaging members 38 along sides of and against prongs of the knob 14.

In an exemplary embodiment, the adapter base 34 has an outer adapter surface 44 facing the proximal end portion 22 of the shaft 16, an inner adapter surface 46 opposite the outer adapter surface 44, and a central opening 42 that extends therethrough. The central opening 42 is aligned with the longitudinal axis 26, and the shaft 16 is disposed in and through the central opening 42.

As illustrated, the adapter base 34 has pocket walls 48 extending from the inner adapter surface 46 defining a pocket 50 that surrounds the central opening 42. The pocket 50 is sized or otherwise configured to accommodate the distal end portion 24 of the shaft 16 so that the adapter body 18 is rotationally engaged with the shaft 16 to rotate together with the shaft 16 when rotated about the longitudinal axis 26. In an exemplary embodiment, the pocket 50 is a polygonal shaped pocket (e.g., a rectangular box shaped pocket, a square box outer shaped pocket, or the like) that substantially matches the polygonal shaped outer profile 32 of the distal end portion 24 of the shaft 16.

In an exemplary embodiment, the adapter base 34 has a boss 52 extending proximally from the outer adapter surface 44. The central opening 42 extends through and is surrounded by the boss 52. The boss 52 has an aperture 54 extending transverse to the longitudinal axis 26 through a side(s) of the boss 52 to the central opening 42. The shaft opening 30 of the shaft 16 is aligned with the aperture 54.

Figure 6:
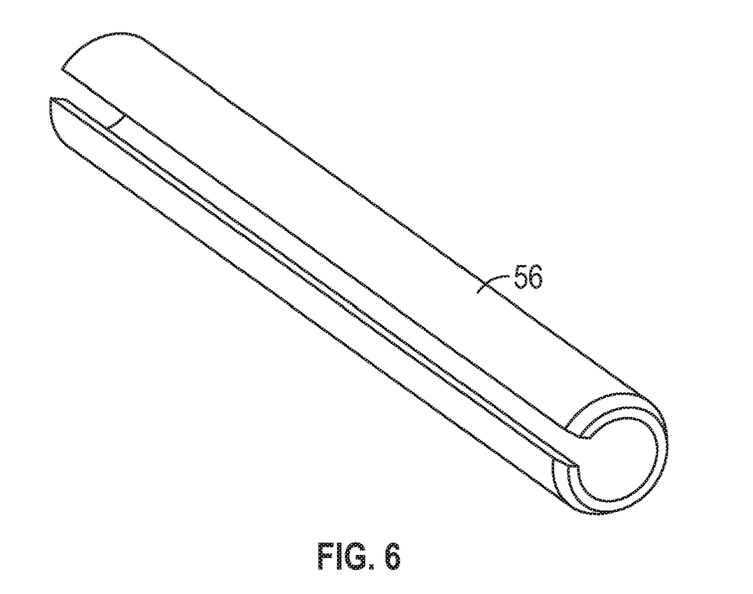
FIG. 6 illustrates a perspective side view of an elongated attachment element in accordance with an exemplary embodiment.
Figure 7:
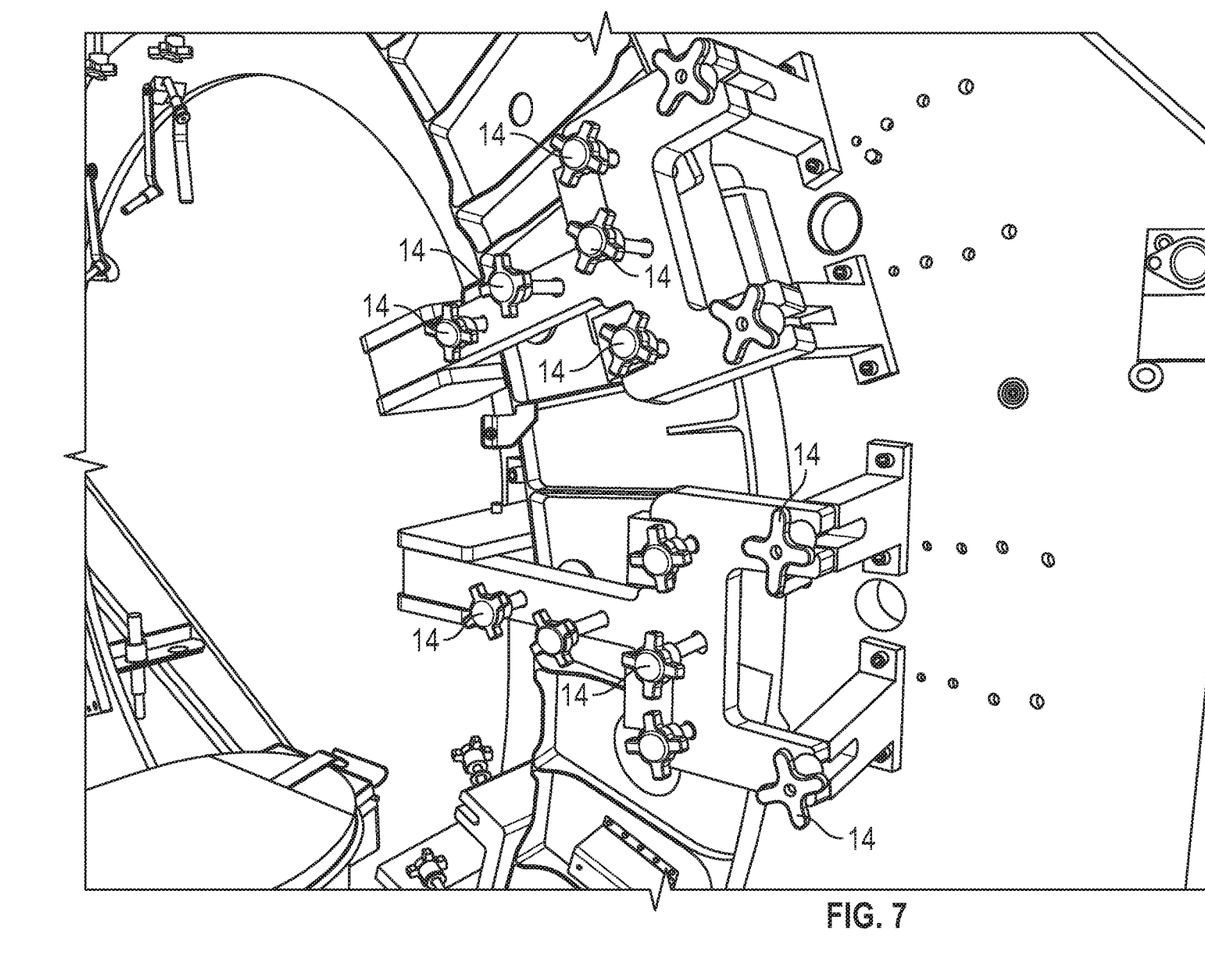
FIG. 7 illustrates a perspective view of a plurality of knobs in accordance with an exemplary embodiment.

Referring also to FIG. 6, as illustrated, an elongated attachment element 56 is disposed through the aperture 54 and the shaft opening 30 to secure or otherwise couple the shaft 16 to the adapter body 18. In an exemplary embodiment, the elongated attachment element 56 is a self-retaining fastener, such as, for example a spring pin (e.g., tension pin or roll pin) that is compressed and exerts force against the channel walls of the aperture 54 and the shaft opening 30.

Figure 8:
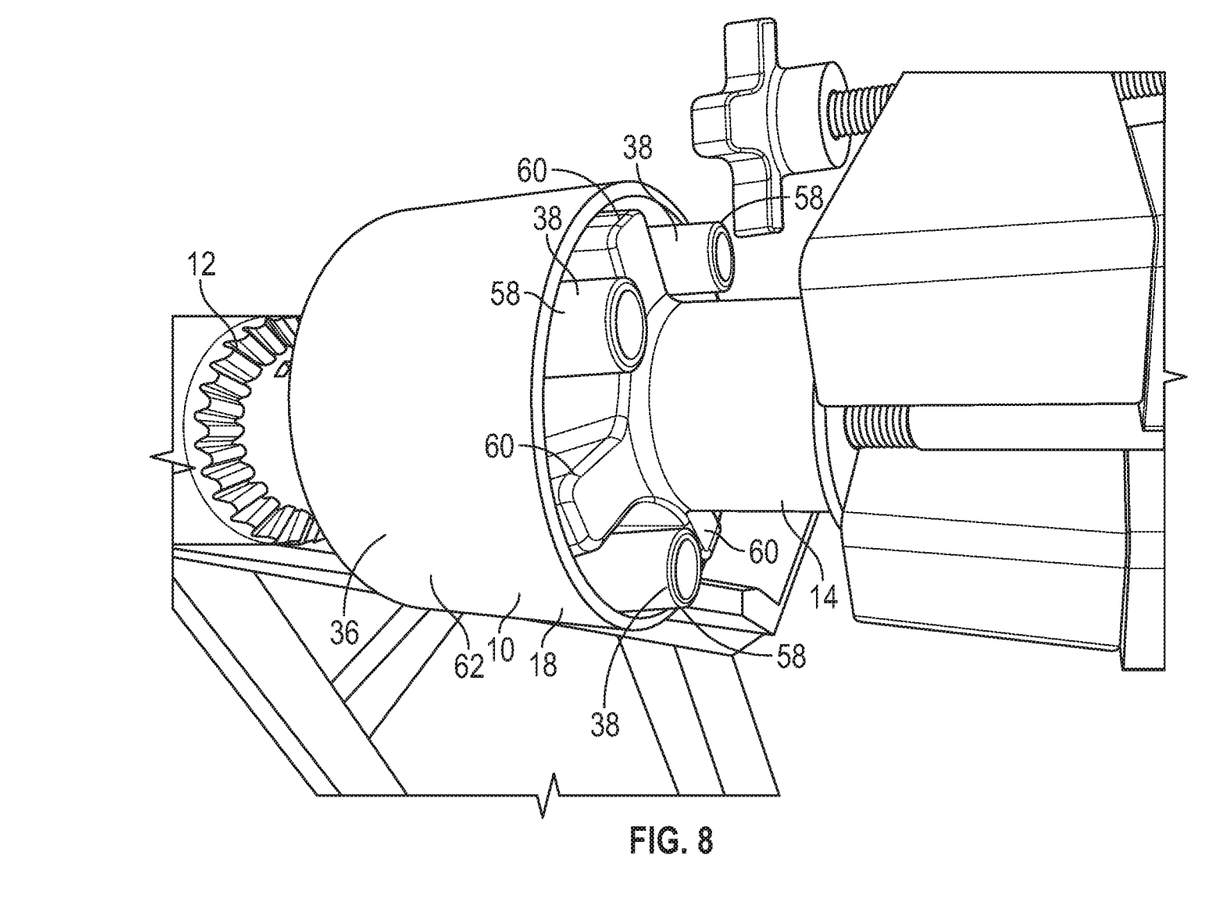
FIG. 8 illustrates a perspective side view of an adapter coupled to a driving device for turning a knob in accordance with an exemplary embodiment.
Figure 9:
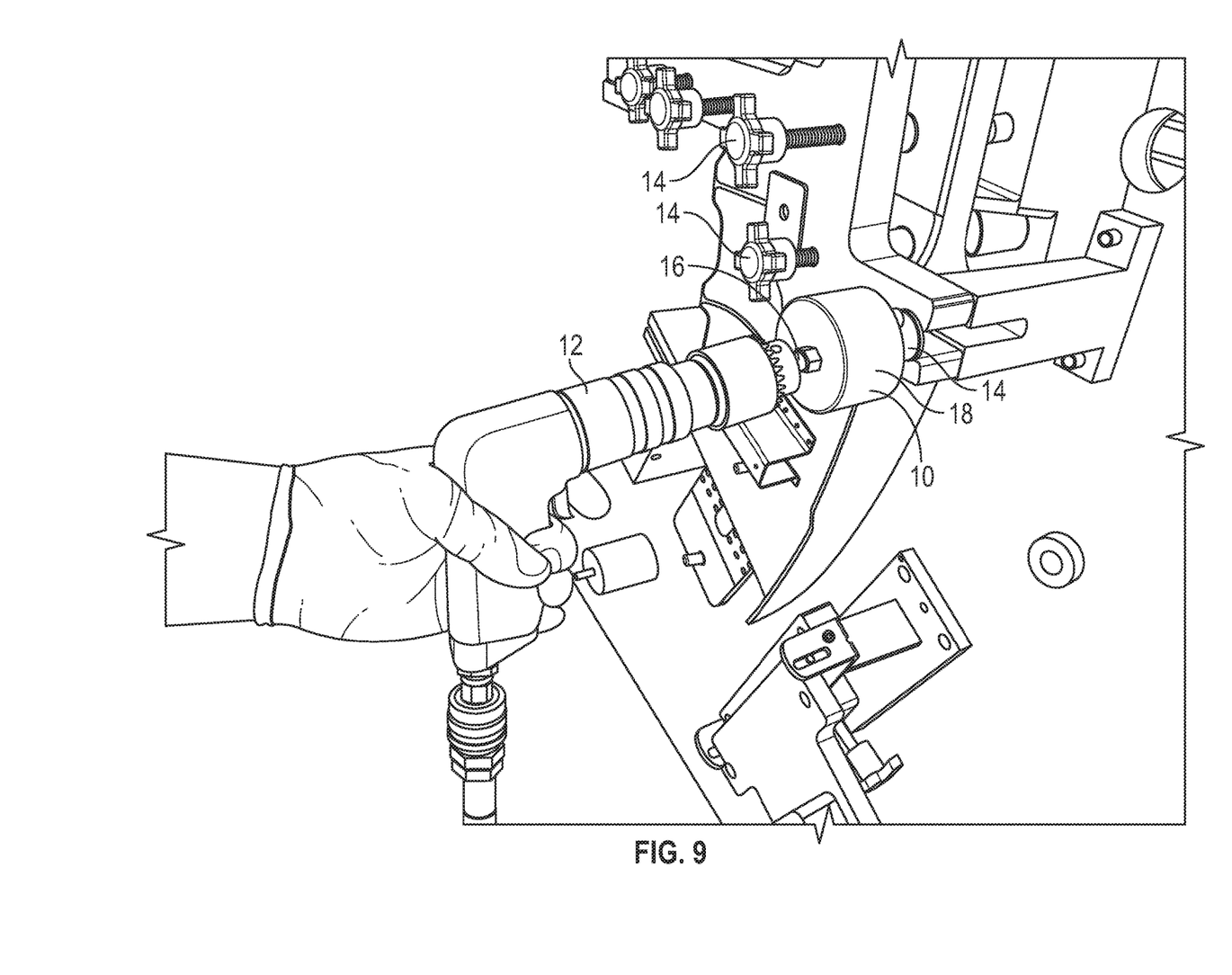
FIG. 9 illustrates a perspective side view of an adapter coupled to a driving device for turning a knob in accordance with an exemplary embodiment.

Referring to FIGS. 1-4 and 8, in an exemplary embodiment, the engaging members 38 are configured as projecting members 58 that are radially spaced apart from and extend distally from the adapter base 34 substantially parallel to the longitudinal axis 26. The projecting members 58 are disposed between the longitudinal axis 26 and the collar 36. As illustrated in FIG. 8, the projecting members 58 are configured to engage the sides of prongs 60 of the knob 14 that extend radially outward from the central portion of the knob 14 to turn the knob 14 in either a tightening direction (e.g., clockwise) or a loosening direction (e.g., counterclockwise). Advantageously, in an exemplary embodiment, the collar 36 covers a substantial portion of the projecting members 58 and the knob 14 when engaged with the knob to prevent a person from getting their finger(s) or other body part(s) caught between the projecting members 58 while the adapter 10 is being rotated by the driving device 12 to turn the knob 14.

In an exemplary embodiment, the adapter 10 includes at least 2 projecting members 58 to engage a knob 14 having at least 2 prongs. In one embodiment, the adapter 10 has the same number or less of projecting members 58 as the knob 14 has prongs. For example, the adapter 10 having 4 projecting members 58 is used on a knob 14 having 4 prongs. In an exemplary embodiment, the adapter 10 includes from 2 to 8 projecting members 58, such as 3 to 6 projecting members 58, for example 4 projecting members 58. In an exemplary embodiment, the projecting members 58 are circumferentially aligned and circumferentially spaced apart a substantially equal distance.

As illustrated, the collar 36 is configured as a cylindrical wall 62 having an inside wall surface 64 facing the longitudinal axis 26. In an exemplary embodiment, the projecting members 58 are each coupled to the inside wall surface 64 to advantageously provide additional support to the projecting members 58 for rotating the knob 14. Further, the adapter body 18 includes ribs 66 (e.g., arcuate ribs with convex surfaces facing the longitudinal axis and that are coupled to the pocket walls 48) that extend between and couple adjacent pairs of the projecting members 58, thereby adding further structure to the adapter body 18.

Figures 1, 2:
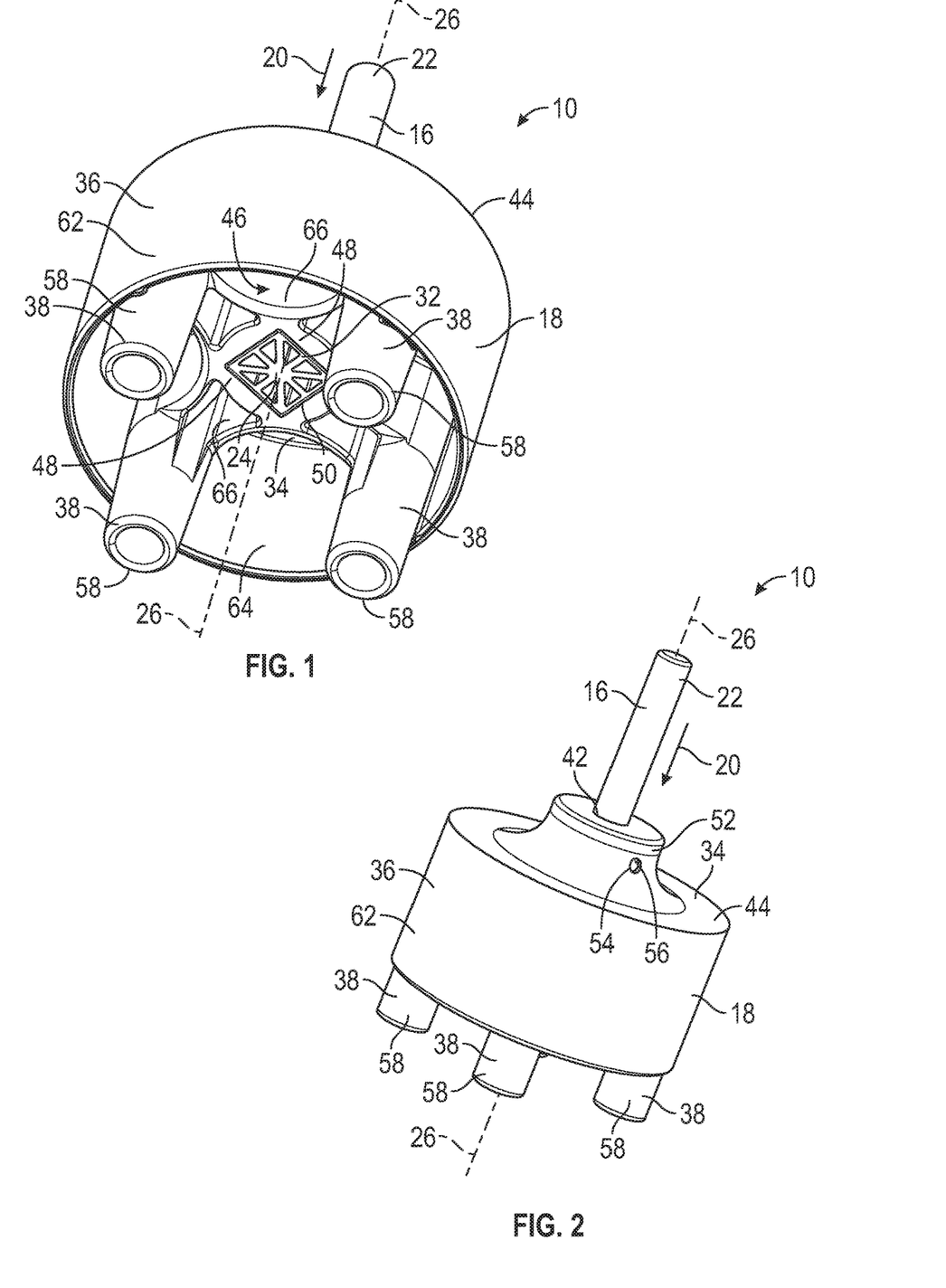
FIG. 1 illustrates a perspective bottom view of an adapter in accordance with an exemplary embodiment.
FIG. 2 illustrates a perspective side view of an adapter in accordance with an exemplary embodiment.
Figure 3:
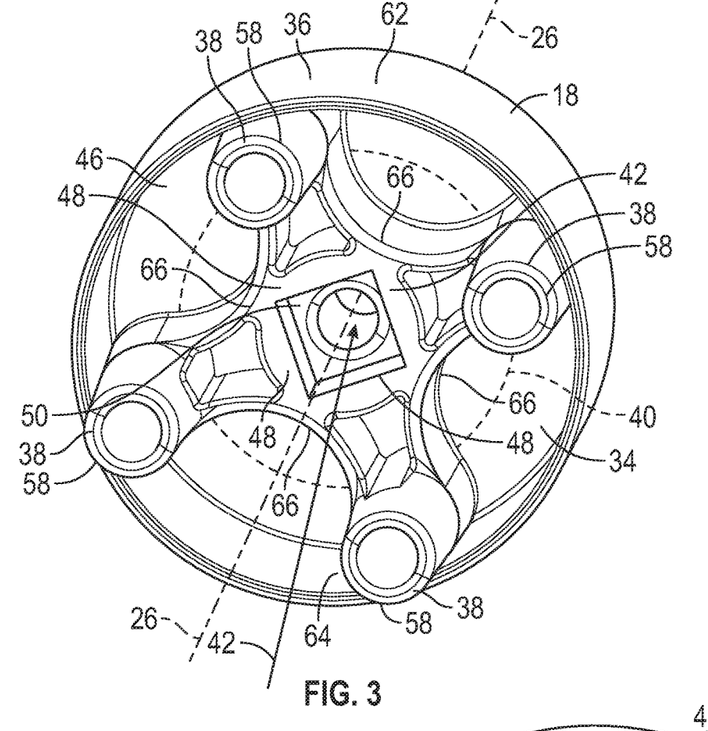
FIG. 3 illustrates a perspective bottom view of an adapter body in accordance with an exemplary embodiment.
Figure 4:
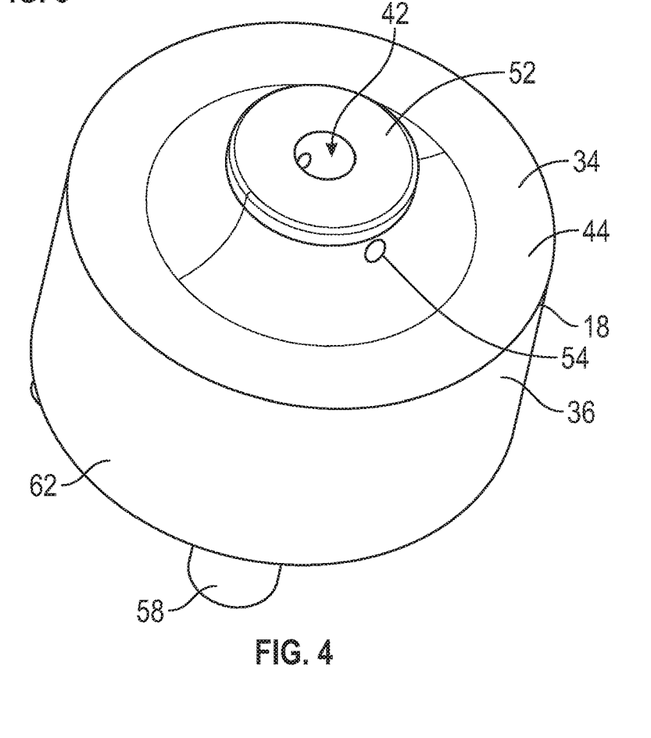
FIG. 4 illustrates a perspective top view of an adapter body in accordance with an exemplary embodiment.

Referring to FIG. 3, optionally or in an alternative embodiment, the adapter body 18 includes the engaging member 40 (indicated by dashed lines) that is configured as an elastomeric or rubber pad insert for engaging the knob 14. In an exemplary embodiment, the engaging member 40 (e.g., the pad insert) is formed of a material selected from an elastomeric material, a rubber material, a polymeric material, a plastic material, a reinforced plastic material, and a combination thereof. The engaging member 40 can be used together with the projecting members 58, or instead of using the projecting members 58 (e.g., depending upon the design of the knob 14) to removably engage the knob 14 for turning in either a tightening or loosening direction(s).

In an exemplary embodiment, the adapter body 18 including the projecting members 58 is formed of a rigid material selected from a polymeric material, a plastic material, a reinforced plastic material, a metallic material, and a combination thereof. In an exemplary embodiment, the shaft 16 is formed separate from the adapter body 18 and is made of a metallic material. Alternatively, the shaft 16 and the adapter body 18 may be integrally formed of the same rigid material.

Figure 10:
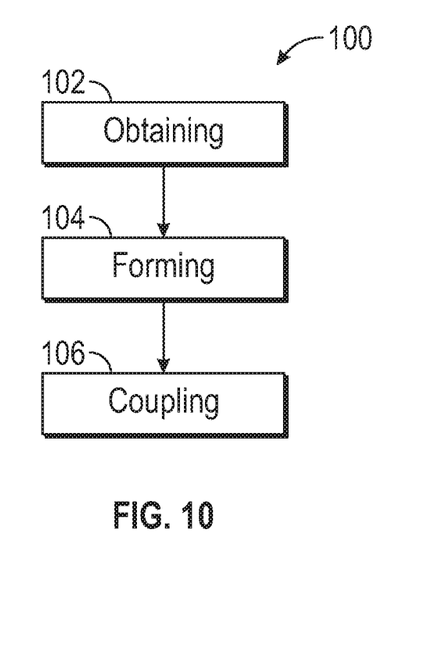
FIG. 10 illustrates a method for making an adapter in accordance with an exemplary embodiment.

FIG. 10 illustrates a method 100 for making an adapter for use with a driving device for turning a knob in accordance with an exemplary embodiment. The method 100 includes obtaining (STEP 102) a shaft extending distally from a proximal end portion to a distal end portion and defining a longitudinal axis. For example, the shaft may be obtained by forming the shaft, procuring the shaft, and/or locating the shaft. The proximal end portion is configured to operatively couple to the driving device for rotating the shaft about the longitudinal axis.

The method 100 further includes forming (STEP 104) an adapter body. The adapter body includes at least one engaging member disposed radially outward from the longitudinal axis and configured for removably engaging the knob. A collar surrounds at least a portion of the at least one engaging member. In an exemplary embodiment, the adapter body is formed using a molding process, a 3-D printing process, or the like, for example using a 3-D printing process. The method 100 further includes coupling (STEP 106) the distal end portion of the shaft to the adapter body.

Figure 11:
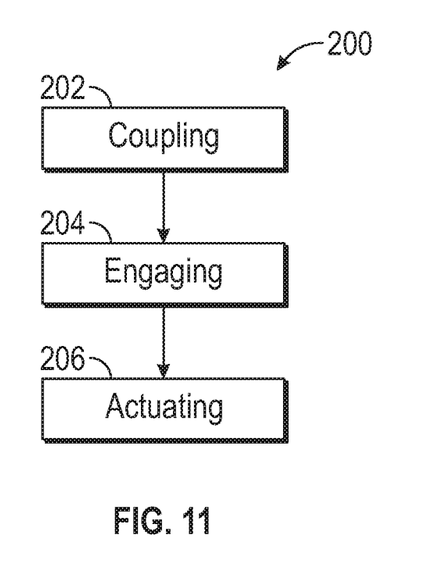
FIG. 11 illustrates a method for turning a knob in accordance with an exemplary embodiment.

FIG. 11 illustrates a method 200 for turning a knob in accordance with an exemplary embodiment. The method 200 includes coupling (STEP 202) a proximal end portion of a shaft of an adapter to a driving device. The shaft extends distally from the proximal end portion to a distal end portion and defines a longitudinal axis. The distal end portion of the shaft is coupled to an adapter body of the adapter.

The method 200 further includes engaging (STEP 202) at least one engaging member of the adapter body with the knob. The at least one engaging member is disposed radially outward from the longitudinal axis. Engaging the at least one engaging member includes positioning the at least one engaging member on the knob such that a collar of the adapter body that at least partially surrounds the at least one engaging member at least partially covers the knob.

The method 200 further includes actuating (STEP 204) the driving device to rotate the shaft about the longitudinal axis, thereby rotating the adapter body including the at least one engaging member to turn the knob. In an exemplary embodiment, a driving device is a torque adjustable drill or the like.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An adapter for use with a driving device for turning a knob, the adapter comprising:
   a shaft extending distally from a proximal end portion to a distal end portion and defining a longitudinal axis, wherein the proximal end portion is configured to operatively couple to the driving device for rotating the shaft about the longitudinal axis; and
   an adapter body coupled to the distal end portion of the shaft, the adapter body comprising:
      at least one engaging member disposed radially outward from the longitudinal axis and configured for removably engaging the knob, wherein the at least one engaging member comprises a plurality of projecting members radially spaced apart from and extending substantially parallel to the longitudinal axis; and
      a collar surrounding at least a portion of the at least one engaging member.

2. The adapter of claim 1, wherein the at least one engaging member further comprises an insert that is formed of a material selected from an elastomeric material, a rubber material, a polymeric material, a plastic material, a reinforced plastic material, a metallic material, and a combination thereof.

3. The adapter of claim 1, wherein the projecting members are disposed between the longitudinal axis and the collar.

4. The adapter of claim 3, wherein the plurality of projecting members includes from 2 to 8 projecting members.

5. The adapter of claim 3, wherein the adapter body further comprises an adapter base that is coupled to the distal end portion of the shaft, and wherein the collar and the projecting members extend distally from the adapter body.

6. The adapter of claim 5, wherein the collar is configured as a cylindrical wall having an inside wall surface facing the longitudinal axis, and wherein the projecting members are correspondingly coupled to the inside wall surface.

7. The adapter of claim 5, wherein the adapter body further comprises at least one rib that extends between and couples an adjacent pair of the projecting members.

8. The adapter of claim 5, wherein the projecting members are circumferentially aligned.

9. The adapter of claim 8, wherein the projecting members are circumferentially spaced apart a substantially equal distance.

10. The adapter of claim 5, wherein the adapter base has a central opening extending therethrough and the shaft is disposed in the central opening.

11. The adapter of claim 10, wherein the adapter base has an outer adapter surface facing the proximal end portion of the shaft and an inner adapter surface opposite the outer adapter surface, and wherein the adapter base has pocket walls extending from the inner adapter surface to define a pocket surrounding the central opening, and wherein the distal end portion of the shaft is disposed in the pocket.

12. The adapter of claim 11, wherein the distal end portion of the shaft has a polygonal shaped outer profile and the pocket is a polygonal shaped pocket that substantially matches the polygonal shaped outer profile of the distal end portion of the shaft.

13. The adapter of claim 11, wherein the adapter base has a boss extending from the outer adapter surface surrounding the central opening, and wherein the boss has an aperture extending transverse to the longitudinal axis through the boss to the central opening, and wherein the shaft has a shaft opening that extends transverse to the longitudinal axis through the shaft and that is aligned with the aperture.

14. The adapter of claim 13, further comprising an elongated attachment element that is disposed through the aperture and the shaft opening to couple the shaft to the adapter body.

15. The adapter of claim 14, wherein the elongated attachment element is a spring pin.

16. The adapter of claim 1, wherein the adapter body is formed of a material selected from a polymeric material, a plastic material, a reinforced plastic material, a metallic material, and a combination thereof.

17. A method for making an adapter for use with a driving device for turning a knob, the method comprising the steps of:
  obtaining a shaft extending distally from a proximal end portion to a distal end portion and defining a longitudinal axis, wherein the proximal end portion is configured to operatively couple to the driving device for rotating the shaft about the longitudinal axis;
  forming an adapter body that comprises:
    at least one engaging member disposed radially outward from the longitudinal axis and configured for removably engaging the knob, wherein the at least one engaging member comprises a plurality of projecting members radially spaced apart from and extending substantially parallel to the longitudinal axis, and
    a collar surrounding at least a portion of the at least one engaging member; and
  coupling the distal end portion of the shaft to the adapter body.

18. The method of claim 17, wherein forming the adapter body comprises using a 3-D printing process for forming at least a portion of the adapter body.

19. A method for turning a knob, the method comprising the steps of:
  coupling a proximal end portion of a shaft of an adapter to a driving device, wherein the shaft extends distally from the proximal end portion to a distal end portion and defines a longitudinal axis, and wherein the distal end portion of the shaft is coupled to an adapter body of the adapter;
  engaging the knob with at least one engaging member of the adapter body, wherein the at least one engaging member is disposed radially outward from the longitudinal axis, wherein the at least one engaging member comprises a plurality of projecting members radially spaced apart from and extending substantially parallel to the longitudinal axis, and wherein engaging the at least one engaging member comprises positioning the at least one engaging member on the knob such that a collar of the adapter body that at least partially surrounds the at least one engaging member at least partially covers the knob; and
  actuating the driving device to rotate the shaft about the longitudinal axis, thereby rotating the adapter body including the at least one engaging member to turn the knob.

20. The method of claim 19, wherein the at least one engaging member comprises a plurality of projecting members radially spaced apart from and extending substantially parallel to the longitudinal axis, wherein engaging the knob comprises engaging the projecting members of the adapter body with the knob including positioning the projecting members correspondingly along sides of the knob such that the collar of the adapter body that at least partially surrounds the projecting members at least partially covers the knob, and wherein actuating the driving device comprises rotating the adapter body including the projecting members to turn the knob.

* * * * *